United States Patent [19]
West et al.

[11] 3,887,690
[45] June 3, 1975

[54] PROCESS FOR PRODUCING CARBON BLACK

[75] Inventors: Jesse R. West, Houston, Tex.; Ollie Middlebrooks, West Monroe, La.; William B. Crull, Dumas, Tex.

[73] Assignee: Continental Carbon Company, Houston, Tex.

[22] Filed: Mar. 11, 1971

[21] Appl. No.: 123,453

Related U.S. Application Data

[63] Continuation-in-part of Ser. No. 776,038, Nov. 15, 1968, abandoned.

[52] U.S. Cl. .............. 423/456; 423/450; 23/259.5; 423/445
[51] Int. Cl. ........................... C09c 1/48; C09c 1/50
[58] Field of Search............ 23/209.4, 259.5, 209.6; 423/449, 455, 457

[56] References Cited
UNITED STATES PATENTS

| | | | |
|---|---|---|---|
| 2,375,795 | 5/1945 | Krejci | 23/209.8 |
| 2,976,127 | 3/1961 | Latham | 23/259.5 |
| 3,235,334 | 2/1966 | Helmers | 23/209.4 |
| 3,362,789 | 1/1968 | Hardy et al. | 23/209.4 |
| 3,523,759 | 8/1970 | Kidd | 23/259.5 |
| 3,607,065 | 9/1971 | Forseth et al. | 23/209.4 |

*Primary Examiner*—Edward J. Meros
*Attorney, Agent, or Firm*—Jerry B. Peterson

[57] ABSTRACT

An oil furnace carbon black reactor and process in which primary heat input, secondary heat input, and the ratio of primary-to-secondary heat input to the reactor are controlled in order to manufacture carcass grades of carbon black having relatively large particle size, low heat buildup, high impact resilience, and other desirable properties.

3 Claims, 3 Drawing Figures

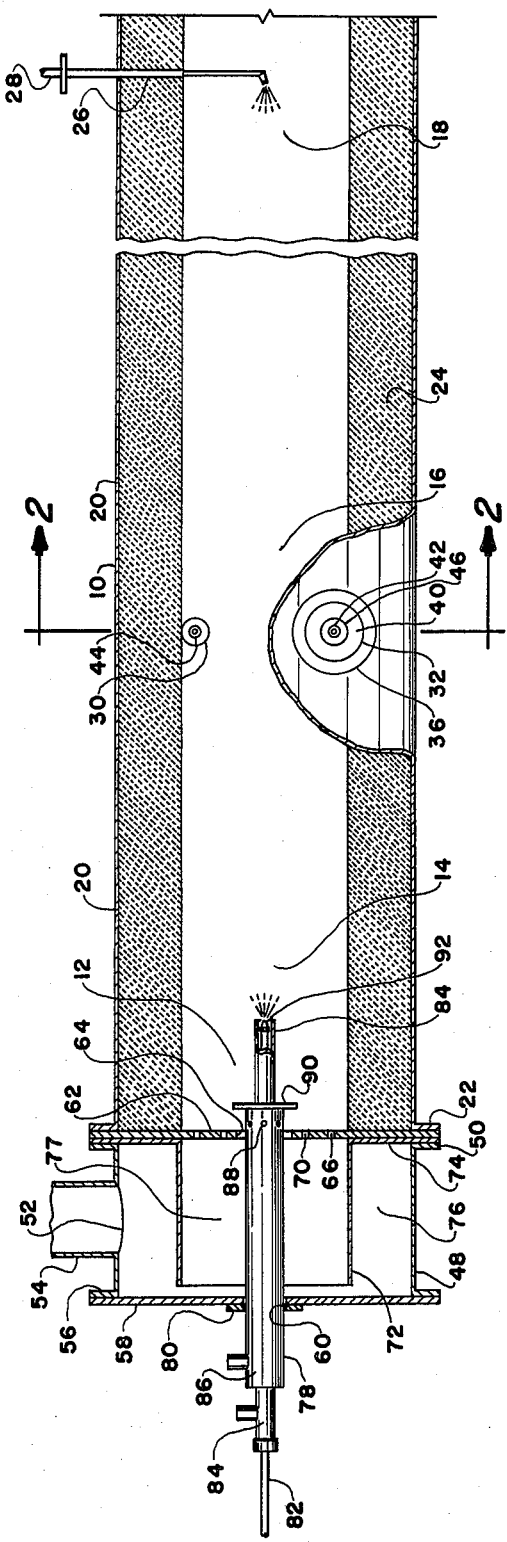

PROCESS FOR PRODUCING CARBON BLACK

CROSS-REFERENCE TO RELATED APPLICATION

This is a continuation-in-part of Ser. No. 776,038, filed Nov. 15, 1968, now abandoned.

BACKGROUND OF THE INVENTION

1. Field of the Invention

This invention relates to the production of oil furnace carbon black by the injection of a suitable hydrocarbon oil feedstock into a heated reaction zone. More particularly, the invention relates to an improved apparatus and process whereby heat is introduced, not only into the upstream end of the reactor in order to establish a primary reaction zone, but also into the reactor at at least one point downstream of the primary reaction zone, in order to establish a secondary reaction zone. In addition, the invention involves the control of the amounts of such primary and secondary heat in order to produce carcass grade blacks of relatively large particle size having good processibility with rubber to provide rubber having relatively low heat buildup and high impact resilience (high rebound).

Carbon blacks are produced by several processes, namely the channel, furnace combustion, furnace thermal, and oil furnace processes.

The channel blacks are produced by impingement of small natural gas flames on the surface of metal collection elements. Channel blacks have been substantially relegated to specialty uses and ink manufacture by the other blacks produced by later developed processes, and manufacture of channel blacks is not considered or included in the scope of the present invention.

The furnace thermal process produces the coarsest carbon blacks that are generally used in applications requiring a high carbon black loading and a minimal reinforcing of the rubber. Thermal blacks have, in addition to large particle size, almost complete absence of structure. The thermal blacks are conventionally produced by the thermal decomposition of gaseous feedstock by intermittent operation of an insulated furnace utilizing heating and production cycles.

The furnace combustion process produces carbon blacks that are generally used for reinforcement of rubber used as tire carcass stocks in which low heat generation is important. These blacks are generally referred to as the gas furnace blacks and are produced by the thermal decomposition of a portion of a feedstock, with the remainder of the feedstock being combusted under oxygen deficient conditions to provide the necessary heat for the carbon forming reaction. Basically the feedstock for furnace combustion blacks is natural gas; however, the practice of enriching the feedstock by injecting liquid hydrocarbon is becoming more prevalent as the natural gas fields become depleted.

The oil furnace process produces the carbon blacks that are used more than all others by the manufacturers of rubber for tires and related applications. These rubber reinforcing blacks are produced by the thermal decomposition or cracking of hydrocarbon feedstocks that are at least partially liquid at normal ambient conditions and have a substantial aromatic hydrocarbon content. The feedstock is introduced into an enclosed furnace to be contacted with the heat of decomposition generated by the separate combustion of a mixture of fuel and air to form the carbon black from the oil feedstock. The combined stream of carbon black suspended in combustion gases is quenched with water at the appropriate point in the reaction to reduce the temperature sufficiently to terminate the carbon black forming reaction.

The combustion gas stream containing suspended particles of carbon black is subjected to a series of steps to separate the carbon black from the gas and provide for the collection of the carbon black for additional processing. This invention is concerned only with the reactor and reaction process by which the carbon black is created, so this disclosure is limited to the furnace reactor or production portion of the manufacturing process.

Oil furnace carbon black reactors are generally of cylindrical elongate configuration and are usually but not always disposed horizontally. The reactor conventionally consists of axially aligned zones of combustion, reaction and quench; with these various zones having different longitudinal dimensions and frequently having different diameters. The fuel and oxygencontaining gas mixture is introduced in varied patterns into the combustion zone.

The characteristics of the oil furnace blacks produced in the reactor vary considerably and are dependent upon combustion conditions, stream flow pattern, composition of the hydrocarbon feedstock and other raw materials, reaction time, and operating conditions within the reactor during production.

2. Description of the Prior Art

U.S. Pat. No. 2,976,127 discloses an oil furnace carbon black reactor which is suitable for making most commercial carcass grades of black. The present invention was developed to provide for the manufacture of large particle-size carcass grades with desirably lower heat buildup and higher resilience or rebound. Iodine number is a commonly-used indicator of particle size, a low iodine number indicating a larger particle size. Twenty-six or twenty-seven was as low in iodine number as could be obtained with the process and apparatus of 2,976,127 or with the apparatus of FIG. 1 without the use of secondary heat introduced through ports 30. As will be seen in the Table below, significantly lower iodine numbers can be obtained by the use of this invention. We can also obtain higher resilience (rebound) and lower heat buildup with the use of this invention than without its use.

U.S. Pat. No. 3,362,789 discloses the application of secondary heat in a carbon black process, but the reaction conditions and purpose for doing so are different. The patentees are concerned with production of blacks having very high structure, which is associated with increased heat buildup. Applicants, on the other hand, are concerned with the production of the lower-structure, low heat buildup carcass blacks. Also, the operating conditions are vastly different. The patentees use a much smaller amount of primary heat (approximately 2100–2500 BTU per pound of oil feedstock) compared with the amount (3500–5200) used by applicants. Furthermore, the patentees use a greater amount of secondary heat (about 5200 BTU per pound of feedstock) than applicants use (1000–2500). Patentees' ratio of primary heat to secondary heat (per pound of feedstock) is about 0.4–0.5; whereas, applicants' ratio is about 2–4.

U.S. Pat. No. 2,419,565 discloses the tangential addition of supplementary heat into the main reaction chamber following an "intermediate chamber." The patentees, however, use tangential flow of primary combustion gases. Furthermore, the patentees use lower amounts of primary heat and a lower ratio of primary heat to secondary heat. The patentees were not concerned with the manufacture of large particle blacks; they were producing fine particle size black (having high abrasion resistance) by using an "intermediate chamber" of restricted diameter with respect to their combustion chamber and their reaction chamber. Applicants do not use a restricted-diameter chamber.

U.S. Pat. No. 3,235,334 discloses the use of secondary heat, but the reaction conditions and purpose for doing so are also different from applicants'. The patentee is concerned with the manufacture of low-structure blacks of relatively small-particle size. Applicants, on the other hand, are concerned with the manufacture of relatively large-particle size carcass blacks. In his only example (Table I), he uses a much greater amount of primary heat (about 11,000–14,000 BTU per pound of oil feedstock) compared with the amount (3500–5200) used by applicants. Furthermore, the patentees use a greater amount of secondary heat (about 2800 BTU per pound of feedstock) than the amount preferred by applicants (1000–2500). Another difference is that the patentee uses a higher ratio (about 5) of primary heat to secondary heat than applicants use (2–4). Still further, the patentee uses tangential flow of primary combustion gases, whereas applicants use longitudinal flow.

U.S. Pat. No. 2,375,795 and 2,616,794, which are less pertinent than the above-mentioned patents, disclose the use of secondary heat, but the processes are vastly different. First of all, the patentees are concerned primarily with a gas furnace process for production of small particle-size black simulating channel black. Applicant' process is an oil furnace process for production of large-particle carcass blacks. Furthermore, the patentees use tangential flow of primary combustion gases rather than longitudinal flow.

The formation of carbon black particles takes place in two stages, the first being the nucleation stage in which, after vaporization of the oil feedstock, there is cracking of carbonhydrogen bonds and molecular rearrangement to form nuclei. The second stage is the growth stage in which additional materials are added to the nuclei. Both of these stages are endothermic, and the required heat is furnished partly by supplied heat and partly by combustion of the hydrogen released as a result of cracking of the carbon-hydrogen bonds.

OBJECTS OF THE INVENTION

It is an object of our invention to distribute the supplied heat required for the process in such a manner that in the nucleation stage of the process, heat and preferably excess oxygen are available to start the formation of nuclei. The highest temperature to be obtained during the entire process is to be reached shortly after the commencement of nucleation. The energy required for the carbon-hydrogen separation will rapidly exhaust the heat capacity of the system until the temperature has been reduced to the point that further nucleation is terminated but the growth phase can still be sustained. For the growth stage of the process it is required that subsequent stages of heat input take place to replenish the heat consumed, sufficiently to sustain particle growth but never so much as to reinitiate nucleation.

Another object of this invention is to manufacture relatively large-particle size carcass grade carbon blacks having properties superior to those which can be produced in equivalent apparatus without the use of this invention.

SUMMARY OF THE INVENTION

This invention includes apparatus and process for the production of furnace carbon black by the thermal decomposition of a suitable hydrocarbon feedstock in an elongated cylindrical reactor having coaxially aligned sections, the main section being lined with refractory material. Intermediate the ends of the main section, at least one tangential port extends through said reactor and lining to a tunnel enclosing a fuel burner assembly. The combustion section has an input port for movement of air through the annular space defined by a cylindrical baffle coaxially mounted within said combustion section. The combustion section is at its upstream end enclosed by a centrally apertured end plate. Air is passed by flow in a longitudinal direction to a combustion zone and mixed with a combustion fuel. The mixture is burned to provide primary heat which is brought into contact with a carbon black feedstock axially introduced into the primary reaction zone of the reactor. Secondary heat in the form of combustion products is introduced tangentially through the tangential port or ports and the reactor lining into contact with the partially formed black and combustion products from the primary reaction zone. The reaction products of carbon black and combustion products pass to the quench zone and are withdrawn from the reactor. The amount of primary heat, the amount of secondary heat, and the ratio of primary heat to secondary heat, are controlled in order to produce carbon black having certain desired properties.

Throughout this disclosure and the appended claims, the term "air" shall mean air, oxygen-enriched air, oxygen, or other oxygen-containing gas.

BRIEF DESCRIPTION OF THE DRAWING

The annexed drawing sets forth in detail illustrative views of the invention, wherein like reference numerals designate like parts, as follows:

FIG. 1 represents a side elvation, partially in longitudinal section illustrating an oil furnace carbon black reactor apparatus suitable for use in the present invention;

FIG. 2 represents a cross-sectional view of a portion of the apparatus of FIG. 1 along line 2—2; and FIG. 3 represents a full view of a reactor element, specifically the diffusion plate 62.

DESCRIPTION OF PREFERRED EMBODIMENTS

The present invention may be readily understood from the following detailed description and by referring to the drawing, particularly FIG. 1. The reactor is generally designated by reference 10 and within the reactor there is a primary combustion zone 12 for furnishing primary heat, a primary reaction zone 14, a secondary reaction zone 16, and the quench zone 18. The reactor 10 is for purposes of description more readily referred to by a main housing section 20. Section 20 has a flange 22 at its upstream end adapted to be affixed to the remainder of the reactor 10, and within section 20 there is an unobstructed refractory lining 24 which has a uniform or substantially uniform diameter. Section 20 has a quench port 26 extending through the refractory lining at a downstream point and a suitable quench means 28 disposed therein for the purpose of terminating the carbon black forming reaction.

The refractory lining 24 has tangential ports 30 extending through housing 20 into communication with secondary reaction zone 16. The description of these tangential ports 30 can be understood by reference to FIG. 2. These ports 30 are placed, in regard to longitudinal relation within main housing section 20 at a point or points intermediate of the primary reaction zone 14 and the quench zone 18, at a location or locations which will be described hereinafter.

A tunnel 32, coaxially aligned with each tangential port 30, is comprised of a cylindrical burner housing 34 affixed to the exterior of section 20 by flange 36. Housing 34 has a cylindrical refractory lining 38 having an interior diameter substantially equal to port 30. The housing 34 is enclosed by a centrally apertured closure plate 40, with combustible mixture conduit 42 having a burner 44 extending into tunnel 32 through packing gland 46. The combustible mixture of fuel and preferably an excess amount of secondary air required to burn said fuel is introduced by conduit 42 into tunnel 32 for ignition and combustion, with passage of the resultant hot stream of combustion products into port 30 to provide the secondary heat to the reactor. Port 30 is adapted to receive said gas stream for tangential introduction into section 20 to establish the secondary reaction zone 16 by burning the hydrocarbon and carbon monoxide gases from the primary reaction zone 14 and to furnish secondary heat for the carbon black growth and treating reaction. The tangential introduction of the hot secondary gas stream forms a whirling flow downstream of the primary reaction zone creating turbulence which causes the partially formed carbon black to more rapidly be contacted by the hot gases. The creation of additional heat and turbulent flow patterns within the reactor are described more fully hereinbelow.

Upstream from the main section 20 is a reactor head housing 48 having a flange 50 at its downstream end. Primary combustion air is introduced through input port 52 extending through the side of housing 48. Air input conduit 54, which is attached to port 52, is connected to a blower and optional preheater, not shown. At the upstream end of housing 48 is flange 56 to which is attached an end plate 58 having a central aperture 60 thereby forming a suitable enclosure of the reactor 10.

There is affixed between sections 20 and 48 a circular air distribution plate 62 as set forth in more detail in FIG. 3 of the drawing. Plate 62 has a central aperture 64, adapted to accommodate an injection and burner assembly described below, and the plate has a diameter sufficient to be affixed as between flanges 22 and 50. There are a series of perforations 66, 68 and 70 extending through plate 62. Perforations 66 are spaced to pass air through plate 62 adjacent the inner wall of lining 24 with other perforations such as 68 and 70 located closer to aperture 64. The pattern and number of perforations through plate 62 can be varied to meet individual situations without departing from the scope of the present invention.

There is coaxially affixed and aligned within housing 48, a cylindrical baffle or sleeve 72 having a suitable flange 74 affixed to flanges 22 and 50 and plate 62, enabling the flush assembly of housing sections 20 and 48 and reactor components contained therein. The mounting of sleeve 72 thereby establishes an annular zone 76 extending between said sleeve and housing 48, said zone having a thickness from one-half to equal the thickness of lining 24, thereby defining a zone or plenum chamber 77 which provides directional flow control for the combustion air. Sleeve 72 extends upstream in a spaced relationship with end plate 58 thereby defining the flow path from port 52 into chamber 77. The air, preheated if desired, passes through input conduit 54 through port 52 into annular zone 76 against sleeve 72 for movement toward end plate 58, around the end of the sleeve, and through chamber 77 by longitudinal flow.

The reactor is equipped with a suitable axial burner and feedstock injection assembly 78, such as is disclosed more fully in U.S. Pat. No. 3,443,761. Assembly 78 extends through packing gland 80 and the central apertures of end plate 58 and distribution plate 62. Particularly there are coaxial conduits for the introduction of the materials required for the carbon black forming reaction, specifically a feedstock conduit 82 enclosed by an axial air conduit 84, and combustion fuel conduit 86, said fuel conduit having burner ports 88 located behind a suitable flameholder disc 90. The carbon black feedstock is injected through conduit 82 for dispersion into the primary reaction zone by a nozzle 92. The assembly is designed to enable extension of the flameholder disc 90 through the plate aperture 64 with reasonable tolerance so that ports 88 are downstream of plate 62 and feedstock is injected into the reaction zone 14 downstream from combustion zone 12. Other suitable assemblies which could be used are disclosed in co-pending applications Ser. Nos. 59,961 or 59,962, both filed July 31, 1970.

Although our invention is not limited to specific dimension, suitable dimensions include a main reactor housing section 20 about forty feet in length with the reactor diameter (inside diameter of refractory lining 24) being about twenty-five to forty inches, with two tangential ports 30 of six inches in diameter. Ports 30 are placed downstream of burner ports 88 at a distance of 6-14, preferably 7-12, times the reactor diameter. Housing 48 has a 12, greater than its length and the sleeve 72 has an inside diameter of 25 inches. Although FIG. 1 shows only one downstream position for these ports 30, additional ports at other positions could be used so long as all of the ports are positioned within the distances set forth above.

In operating the subject apparatus in accordance with the process of the present invention, the conditions of combustion are established in the combustion zone 12 of the carbon black reactor by introducing air through the conduit 54 into the annular space 76 surrounding sleeve 72 and through the central aperture 64 and perforations 66, 68 and 70 of distribution plate 62 into the combustion zone 12 wherein it mixes with combustion fuel being introduced by conduit 86 of the burner assembly 78 through ports 88 to form a mixture that is ignited for combustion within zone 12 to provide the primary heat to the reactor.

The fuel for combustion can be any hydrocarbon gas such as natural gas, various petroleum refinery off-gas streams, or normally liquid hydrocarbons capable of being substantially vaporized. A typical volume analysis of a suitable natural gas is as follows:

| | |
|---|---|
| Methane | 72.09% |
| Ethane | 9.38% |
| Propane | 6.24% |
| Isobutane | 0.24% |
| N-Butane | 1.08% |
| Isopentane | 0.22% |
| N-Pentane | 0.25% |
| N-Hexane | 0.18% |
| Nitrogen | 9.74% |
| Helium | 0.28% |
| Carbon Dioxide | 0.08% |

The fuel and air are introduced in the following volume ratios (standard cubic feet per hour, SCFH):

| | Suitable | Preferred |
|---|---|---|
| Primary air-to-gas ratio | 10:1–15:1 | 12:1–14:1 |
| Secondary air-to-gas ratio | 10:1–20:1 | 12:1–18:1 |

The hydrocarbon feedstock capable for forming a suitable carbon black depends upon the reactor design and operating conditions; however, such feedstock is generally characterized as a highly aromatic hydrocarbon, as derived from petroleum or coal refining operations, free of deleterious materials, and generally at least partially liquid at ambient conditions. A preferred feedstock for the manufacture of carbon black in a furnace reactor has the following specifications:

| | |
|---|---|
| Gravity, °API at 60°F. | 1.9 |
| Viscosity at 122°F., SSF | 113.7 |
| BS&W % | 0.1 |
| Ash % | 0.03 |
| Asphaltenes % | 8.60 |
| Sulphur % | 0.81 |
| Carbon % | 91.58 |
| Hydrogen % | 8.63 |
| Kinematic Vis. Centistokes | 240 |
| Characterization Factor | 12.5 |
| Bu. Mines Correlating Index | 117.6 |
| Distillation Range, °F. | |
| IBP | 497 |
| 10% | 624 |
| 20% | 685 |
| 30% | 727 |
| 40% | 767 |
| 50% | 810 |
| 60% | 857 |

The fuel and air are introduced into the combustion zones of the reactor and ignited. The hydrocarbon feedstock, with optional preheating, is then passed axially into the primary reaction zone 14 through the injection assembly by spraying the same through a nozzle on the end of the feedstock injection conduit, said nozzle having a spray angle of a conventional nature in the order of 30° to 80° from the axis thereof. The carbon black forming reaction commences at the point of introducing feedstock into the primary reaction zone and continues in the secondary reaction zone. The particle size basically is controlled by controlling the following ratios: Primary heat to feedstock; secondary heat to feedstock; and primary heat to secondary heat. The secondary heat is provided to the secondary reaction zone by burning fuel with air in tunnel ports 30 and allowing the combustion gases to pass into the reactor. The stream of reaction products passes from the primary to the secondary reaction zone for exposure to the tangentially introduced combustion gases where the added heat completes the carbon forming reaction.

The introduction of the secondary combustion gases through the downstream tangential ports also increases the stream velocity through the reactor and creates a condition of turbulent motion by which the carbon particles are surface treated by the additional heat to reduce the tar content and impart other desirable characteristics to the black. In other words, the use of oil rates which are high (per unit of primary heat) as compared with the rates used in the production of fine particle blacks, could result in too much unburned oily material on the black. The secondary heat, however, will burn these oily materials so that excessive coke (grit) will not form and so that the photrometer specifications can be met.

The suitable primary heat input, in BTU per pound of feedstock, is 3500–5200 and preferably 3600–4500.

The suitable secondary heat input, in BTU per pound of feedstock, is 1000–2500 and preferably 1200–2000.

The suitable ratio of primary heat input to secondary heat input is about 2–4.

The Table lists various operating conditions and results obtained using the apparatus shown in the drawings to manufacture SRF carbon black.

TABLE

| Run Number | 1 | 2 | 3 | 4 | 5 | 6 | 7 | 8 | 9 | 10 |
|---|---|---|---|---|---|---|---|---|---|---|
| REACTOR DIAMETER, INCHES | 25 | 25 | 25 | 25 | 25 | 25 | 25 | 25 | 25 | 25 |
| PRIMARY REACTION ZONE | | | | | | | | | | |
| a) Combustion Air, SCFH | 108,600 | 83,750 | 83,500 | 122,930 | 79,200 | 79,200 | 78,350 | 75,900 | 123,200 | 81,340 |
| b) Air-to-Gas Ratio | 13/1 | 14.5/1 | 14.5/1 | 14/1 | 13.75/1 | 13.75/1 | 13/1 | 13/1 | 14/1 | 14/1 |
| c) Primary Heat Input, MBTU/Hr. | 9500 | 6,579 | 6,560 | 10,002 | 6,561 | 6,561 | 6,864 | 6,649 | 10,170 | 6,618 |
| d) Feedstock Oil Rate, Gal./Hr. | 212.4 | 181 | 182 | 256 | 187 | 194 | 181.5 | 171.4 | 240 | 186 |
| e) Primary Heat Input Per Pound of Feedstock, BTU/Lb. | 4,470 | 4,081 | 4,047 | 4,387 | 3,941 | 3,797 | 4,248 | 4,357 | 4,759 | 3,994 |
| SECONDARY REACTION ZONE | | | | | | | | | | |
| a) Distance from Primary Combustion Ports | — | 11′–3″ | 18′–9″ | 18′–9″ | 18′–9″ | 18′–9″ | 18′–9″ | 18′–9″ | 23′–9″ | 23′–9″ |
| b) Combustion Air, SCFH | None | 25,000 | 25,000 | 25,000 | 29,000 | 29,000 | 30,000 | 32,500 | 25,000 | 30,000 |
| c) Air-to-Gas Ratio | — | 13/1 | 13/1 | 13/1 | 15/1 | 15/1 | 18/1 | 13/1 | 13/1 | 16/1 |

TABLE —Continued

| Run Number | 1 | 2 | 3 | 4 | 5 | 6 | 7 | 8 | 9 | 10 |
|---|---|---|---|---|---|---|---|---|---|---|
| d) Secondary Heat Input, MBTU/Hr. | — | 2,190 | 2,190 | 2,190 | 2,202 | 2,202 | 1,899 | 2,848 | 2,190 | 2,136 |
| e) Secondary Heat per Pound of Feedstock, BTU/Lb. | — | 1,359 | 1,351 | 961 | 1,323 | 1,274 | 1,174 | 1,866 | 1,025 | 1,289 |
| RATIO PRIMARY: SECONDARY HEAT, BTU/LB. | — | 3.00 | 3.00 | 4.57 | 2.98 | 2.98 | 3.62 | 2.33 | 4.64 | 3.10 |
| Specific Surface a) Iodine Adsorption (ASTM D-1510) | 30.0 | 31.6 | 22.5 | 26.5 | 22.5 | 21.3 | 20.1 | 21.1 | 26 | 21.2 |
| b) Nitrogen Adsorption | 36.0 | 33.6 | 26.4 | 30.7 | 25.7 | 24.2 | — | 25.0 | — | 27.2 |
| Rebound[1] Goodyear Healy Test % Impact Resilience (ASTM D-1054) | +8.3 | +12.1 | +14 | +10.5 | +12.2 | +12.2 | +11.3 | +12.3 | — | +11.7 |
| Firestone Test % | +12.5 | +11.0 | +15.2 | +12.9 | +14.3 | +15.7 | +16 | +15.4 | — | +17.5 |
| Heat Buildup[1] Firestone Method[2], °F. | −30 | −42 | −41 | −38 | −48 | −53 | −56 | −50 | — | −51 |

[1]Compared with Industrial Reference Black (IRB 2)
[2]ASTM D-623

In Run No. 1, no secondary heat was used. The results from Run No. 2 did not provide the desired improvement over the normal carcass grades of SRF black (heat buildup too high; rebound too low). The secondary heat input in Run No. 4 was too low and the ratio of primary heat to secondary heat was too high. In Run No. 2, the iodine number was also too high (and particle size therefore too small). In Run No. 2, the ratio of the distance from primary heat input to secondary heat to reactor diameter was only 5.4. (As pointed out above, this ratio should be at least 6, preferably (7–12.). Run No. 9 was inconclusive because the heat buildup and rebound data was not obtained, but it is our belief that the secondary heat input was on the low side and the ratio of primary heat to secondary heat was too high. This leaves Run Nos. 3, 5, 6, 7, 8 and 10 as exemplary of the proper reaction conditions resulting in good carcass blacks having relatively large particle size (low iodine number), low heat buildup, and high rebound.

While we have thus described the preferred embodiments of the present invention, many variations will be suggested to those skilled in the art. The foregoing description and examples should therefore not be considered limitative; and all such variations and modifications as are in accord with the principles described are meant to fall within the scope of the appended claims.

Having thus described our invention, we claim:

1. In a process for the production of carcass grades of oil furnace carbon black in which a carbon black feedstock is introduced axially into one end of an elongate, substantially cylindrical, refractory lined reactor of substantially uniform diameter into a primary reaction zone heated by primary hot combustion gases from the burning of a hydrocarbon gas or other fuel with air, said combustion gases flowing in longitudinal downstream flow, the improvement which comprises:
   a. supplying said primary hot combustion gases in an amount of about 3500–5200 BTU per pound of said feedstock;
   b. supplying secondary heat to said reactor as a stream or streams of secondary combustion gases introduced in tangential flow at a point or points located at distances downstream of the point of introduction of said primary heat equal to about 6–14 times the inside diameter of said refractory lining, the amount of said secondary heat being about 1000-2500 BTU per pound of said feedstock;
   c. the ratio of the quantity of said primary heat to said secondary heat being from about 2 to about 4.

2. The process of claim 1 in which:
   a. said primary heat is supplied in an amount of about 3600–4500 BTU per pound of said feedstock;
   (b) said secondary heat is supplied at a distance downstream of the point of introduction of said primary heat equal to about 7-12 times the inside diameter of said refractory lining in an amount of about 1200–2000 BTU per pound of said feedstock.

3. The process of claim 2 in which the air-to-gas ratio for said primary combustion is from about 12:1 to about 14:1 and the air-to-gas ratio for said secondary combustion is from about 12:1 to about 18:1.

* * * * *